United States Patent [19]
Kajouke et al.

[11] Patent Number: 6,154,381
[45] Date of Patent: *Nov. 28, 2000

[54] HIGH EFFICIENCY POWER SYSTEM WITH PLURAL PARALLEL DC/DC CONVERTERS

[75] Inventors: Lateef A. Kajouke, San Pedro; Steven E. Schulz, Redondo Beach, both of Calif.

[73] Assignee: General Motors Corporation, Detroit, Mich.

[*] Notice: This patent is subject to a terminal disclaimer.

[21] Appl. No.: 09/345,278

[22] Filed: Jun. 30, 1999

[51] Int. Cl.[7] .................................................. H02M 3/00
[52] U.S. Cl. .............................................................. 363/65
[58] Field of Search ............................................... 363/65, 71

[56] References Cited

U.S. PATENT DOCUMENTS

| | | | |
|---|---|---|---|
| 5,530,635 | 6/1996 | Yashiro | 363/65 |
| 5,768,117 | 6/1998 | Takahashi et al. | 363/65 |
| 5,803,215 | 9/1998 | Henze et al. | 191/2 |
| 5,821,755 | 10/1998 | Henze | 324/426 |
| 5,875,104 | 2/1999 | Prager | 363/65 |
| 5,883,797 | 3/1999 | Amaro et al. | 363/71 |
| 5,923,549 | 7/1999 | Kobayashi et al. | 363/65 |

*Primary Examiner*—Jeffrey Sterrett
*Attorney, Agent, or Firm*—Christopher DeVries; Anthony Luke Simon

[57] ABSTRACT

A distributed staged power system for use in electric and hybrid electric vehicles, and the like. The system comprises a plurality of parallel DC-to-DC power modules that are controlled by way of input and output control signal interfaces using a smart controller. The distributed staged power system provides higher efficiency because of smart staging of the power modules. The distributed staged power system enables or disables each of the modules as determined by a smart controller to provide the highest possible conversion efficiency.

14 Claims, 3 Drawing Sheets

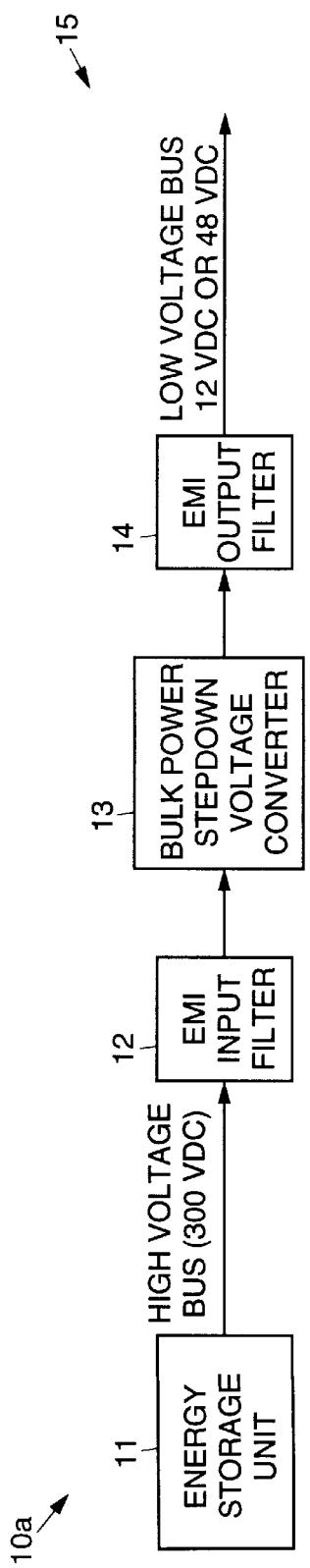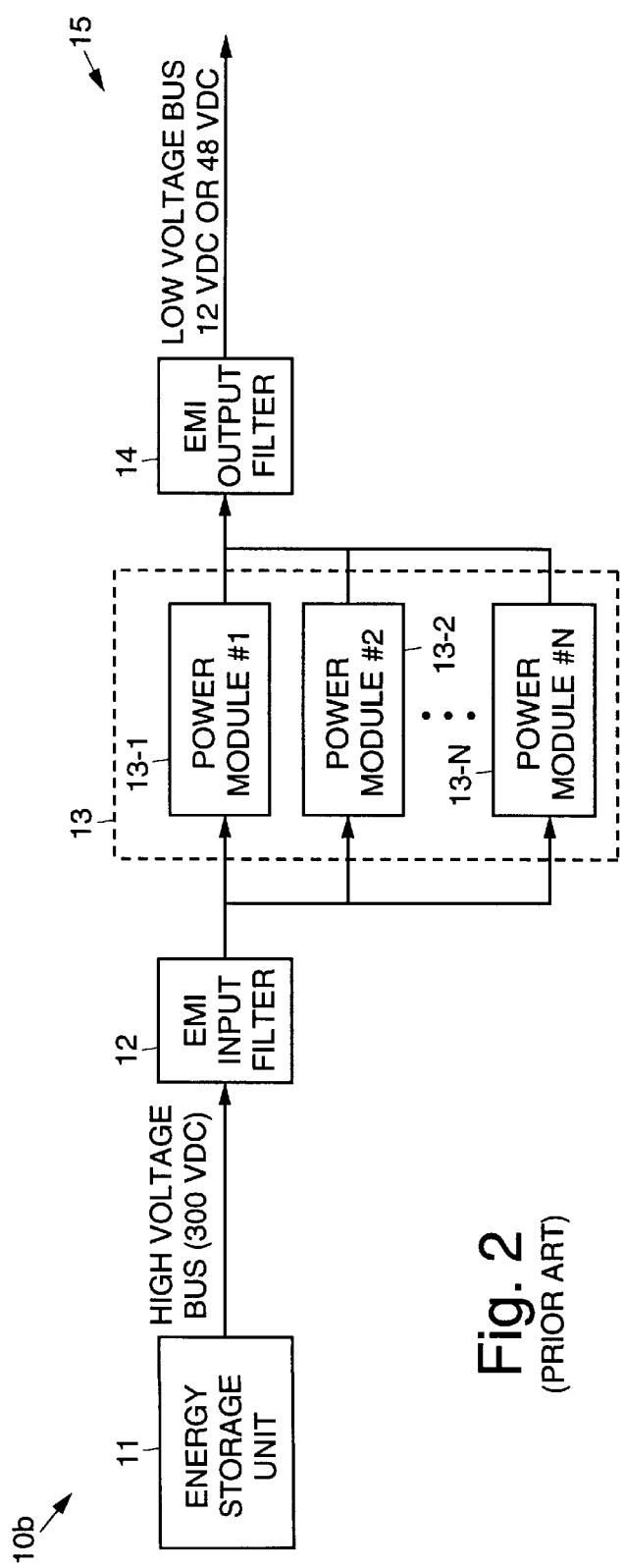
Fig. 1 (PRIOR ART)
Fig. 2 (PRIOR ART)

6,154,381

HIGH EFFICIENCY POWER SYSTEM WITH PLURAL PARALLEL DC/DC CONVERTERS

BACKGROUND

The present invention relates generally to electric vehicles, and more particularly, to an improved high efficiency distributed staged power system for use in electric and hybrid electric vehicles.

The assignee of the present invention designs and develops electric vehicles and power systems for use therein. Prior art related to power systems for electric vehicles includes single-module-level designs and power modules interconnected for current sharing and reliability. There are a variety of documents, including patents and articles, that describe single, high-efficiency DC-to-DC converters. Other documents discuss the interconnecting the power modules to achieve current sharing and reliability. The present inventors are not aware of any document that discusses staging of paralleled modules to achieve optimal efficiency.

Prior art distributed power systems typically utilize either a single bulk power supply or multiple parallel power modules configured in a current share mode (see FIGS. 1 and 2). However, power electronics are now being incorporated in to electric and hybrid electric vehicles that require very high efficiency power conversion in order to maintain an acceptable driving range. The problem is even more severe in a hybrid electric vehicle, where the auxiliary load is quite large due to the increased numbers of fans and pumps compared with an electric vehicle.

Prior art power systems have low efficiency when load demand drops. This is true for either the single, large, bulk power supply or with multiple-parallel power modules, configured in a current share mode. In the multiple-parallel power module system, with all modules equally sharing the load current, each module provides only a small fraction of its overall load capability most of the time. The well-known efficiency versus load characteristics of switching power supplies indicates that operation at light load results in poor efficiency.

It would therefore be desirable to have an improved high efficiency distributed staged power system for use in electric and hybrid electric vehicles.

SUMMARY OF THE INVENTION

The present invention comprises a high efficiency distributed staged power system that may be used in electric and hybrid electric vehicles. An exemplary high efficiency distributed staged power system comprises an energy storage unit coupled by way of a high voltage bus to an input filter. A parallel voltage converter comprising a plurality of power modules are respectively coupled in parallel between the input filter and an output filter. A low voltage bus is coupled between the output filter and one or more loads. Input and output control signal interfaces are coupled to each of the plurality of power modules. A smart controller is coupled to the input and output control signal interfaces, and also may be coupled to a vehicle controller.

The system provides optimal efficiency for a given set of paralleled DC-to-DC power modules. The high efficiency distributed staged power system may use the same types of components used in previous modular power systems, such as those developed by the assignee of the present invention, for example, but provides higher efficiency due to smart staging of the modules.

The distributed staged power system architecture enables or disables each of the modules as determined by a smart controller to provide the highest possible conversion efficiency. This concept may be extended to any parallel power module configured system where the module efficiency is not constant with respect to load. The smart controller relies on the fact that the module efficiency varies with load, so that an optimal operating point does exist.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 illustrates the architecture of a conventional bulk power stepdown power system;

FIG. 2 illustrates the architecture of a conventional current sharing parallel power module system;

DETAILED DESCRIPTION

Figure 3:
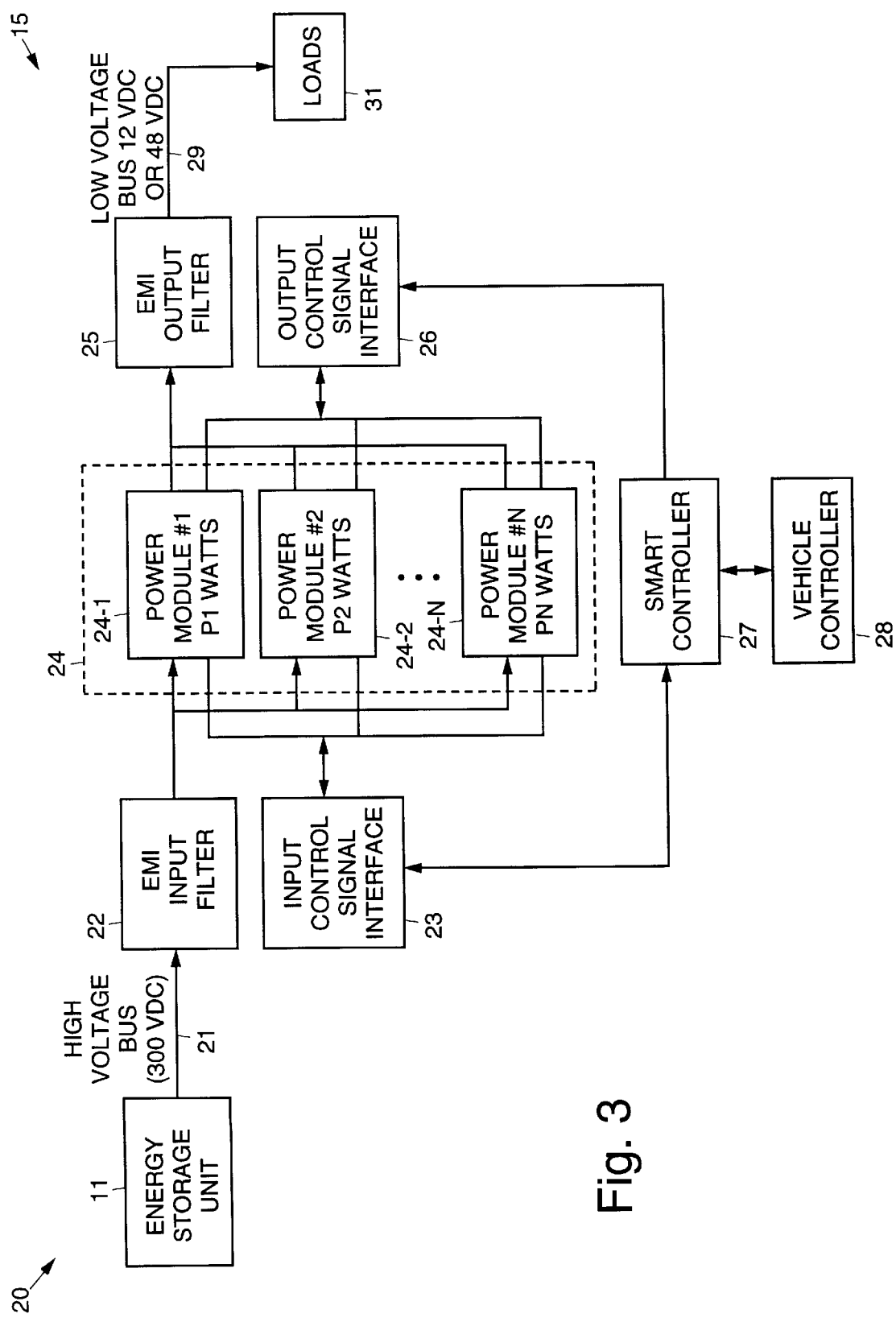
FIG. 3 illustrates the architecture of a high efficiency distributed staged power system in accordance with the principles of the present invention.

Referring to the drawing figures, FIG. 1 illustrates the architecture of a conventional bulk power stepdown power system 10a for supplying accessory power to an electric vehicle 15. The conventional bulk power stepdown power system 10a comprises an energy storage unit 11 that is coupled by way of a high voltage bus to an electromagnetic (EMI) input filter 12. The output of the EMI input filter 12 is coupled to a bulk power stepdown voltage converter 13. The output of the bulk power stepdown voltage converter 13 is coupled to an EMI output filter 14. The output of the EMI output filter 14 is coupled by way of a low voltage bus at 12 VDC or 48 VDC to accessories of the electric vehicle 15.

FIG. 2 illustrates the architecture of a conventional current sharing parallel power module system 10b. The conventional current sharing parallel power module system 10b comprises an energy storage unit 11 that is coupled by way of a high voltage bus to an electromagnetic (EMI) input filter 12. The output of the EMI input filter 12 is coupled to a parallel voltage converter 13 comprising a plurality of parallel power modules 13-1, 13-2, . . . 13-N configured in current sharing mode. The outputs of the parallel power modules 13-1, 13-2, . . . 13-N of the parallel voltage converter 13 are coupled to an EMI output filter 14. The output of the EMI output filter 14 is coupled by way of a low voltage bus at 12 VDC or 48 VDC to accessories of the electric vehicle 15.

The power systems 10a, 10b disclosed with reference to FIGS. 1 and 2 have low efficiency when load demand drops. This is true for either the bulk power supply shown in FIG. 1 or with multiple-parallel power modules system configured in a current share mode shown in FIG. 2. In the parallel power module system 10b of FIG. 2, with all modules equally sharing the load current, each module provides only a small fraction of its overall load capability most of the time. The well-known efficiency versus load characteristics of switching power supplies indicates that operation at light load results in poor efficiency.

In order to overcome the deficiencies of the above-described conventional power converters, the present invention provides for an improved high efficiency distributed staged power system 20. FIG. 3 illustrates the architecture of an exemplary high efficiency distributed staged power system 20 in accordance with the principles of the present invention. In the high efficiency distributed staged power system 20, the efficiency versus load characteristics is taken into account, and the system 20 automatically configures itself to produce optimal efficiency.

The high efficiency distributed staged power system 20 is intended for electric vehicle or hybrid electric vehicle accessory power applications. It is intended to provide the highest accessory power system efficiency in order to maximize the range of such a vehicle 15.

The high efficiency distributed staged power system 20 comprises an energy storage unit 11 that is coupled by way of a high voltage bus 21 to an electromagnetic (EMI) input filter 22. The output of the EMI input filter 22 is coupled to a parallel voltage converter 24 comprising a plurality of parallel power modules 24-1, 24-2, . . . 24-N. The outputs of the plurality of parallel power modules 24-1, 24-2, . . . 24-N of the parallel voltage converter 24 are coupled to an EMI output filter 25. The output of the EMI output filter 25 is coupled by way of a low voltage bus 29 providing 12 VDC or 48 VDC to loads 31, including accessories of the electric vehicle 15.

The system also comprises a smart controller 27 that is coupled to a vehicle controller 28 and to input and output control signal interfaces 23, 26. The input and output control signal interfaces 23, 26 are respectively coupled to each of the individual parallel power modules 24-1, 24-2, . . . 24-N of the parallel voltage converter 24.

The energy storage unit 11 provides an energy source for the system 20. The energy storage unit 11 may be comprised of a battery pack, a fuel cell, a super capacitor, a motor/generator set, or any combination thereof. The energy storage unit 11 outputs a high voltage, typically 300 VDC or more.

The output of the energy storage unit 11 is connected to the high voltage bus 21. The high voltage bus 21 serves to distribute the high voltage to various high voltage systems in the vehicle 15. Some of the systems that may be connected to the high voltage bus 21 include a traction motor drive inverter, a power-steering motor drive inverter, an air-conditioning compressor motor drive inverter, and an accessory power system.

The power modules 24-1, 24-2, . . . 24-N typically comprise high-efficiency switching power supplies. The switching power supplies tend to generate unwanted electrical noise and are therefore filtered. The input filter 22 is provided to isolate the noisy power modules 24-1, 24-2, . . . 24-N from the energy storage unit 11. The input filter 22 is designed to minimize ripple current drawn from the energy storage unit 11, such that conducted and radiated electromagnetic noise emissions from the system 20 are acceptable. The input filter 22 also serves to minimize harmful transients, which may be generated at the energy storage unit 11 and propagate to the power modules 24-1, 24-2, . . . 24-N, causing degradation of components and system failure.

The power modules 24-1, 24-2, . . . 24-N are typically high efficiency switchmode DC-to-DC converters. There are N modules 24-1, 24-2, . . . 24-N connected in parallel. The DC power inputs of each module 24-1, 24-2, . . . 24-N are connected in parallel. The DC power outputs of each module 24-1, 24-2, . . . 24-N are also connected in parallel. The modules 24-1, 24-2, . . . 24-N need not be identical components. Each module 24-1, 24-2, . . . 24-N is designed to provide the same DC voltage gain, M, given by:

$$M = \frac{V_{out}}{V_{in}}$$

where $V_{out}$ is the DC output bus voltage provided to the load 31, and $V_{in}$ is the DC input bus voltage from the energy storage unit 11. The power modules 24-1, 24-2, . . . 24-N may be designed to provide different load power or current as required to optimize a particular design. For example, the system 20 may include a 500 W converter (module 24-1), a 250 W converter (module 24-2), and a 100 W converter (module 24-3) all connected in parallel and feeding the same load.

The power modules 24-1, 24-2, . . . 24-N require the output filter 25 for the same reasons described above for the input filter 22. Output voltage ripple is typically minimized with the filter design. The output filter 25 also prevents any transients, which may be generated by the various loads 31, from damaging the power modules 24-1, 24-2, . . . 24-N.

The outputs of all the modules 24-1, 24-2, . . . 24-N are filtered and tied together at the output low voltage bus 29. The voltage of the output low voltage bus 29 is determined by the overall load requirements of the vehicle 15, but can be in the range of 12V through 42V for typical applications. Higher voltage outputs such as 42V may be desired to reduce losses associated with the distribution of the low voltage bus power throughout the vehicle 15. The vehicle 15 need not be constrained to a single low voltage bus 29, but may have multiple busses 29. An example would be to have both a 12V and a 42V busses 29. In this case, the vehicle 15 would have two systems 20 as shown in FIG. 3, with two separate low voltage output busses 29, but sharing a single energy storage unit 11.

The vehicle loads 31 are fed from the low voltage bus 29, and are determined by the vehicle design. These loads 31 may include lighting, controllers, fans, pumps, radio/entertainment, electric power windows, door locks, and the like.

The input control signal interface 23 passes signals back and forth between the high voltage input side of the power system 20 and the smart controller 27. Examples of signals include power module enable/disable signals, a power module fault indicator signal, and a high voltage measurement signal. The input signal interface 23 may provide electrical isolation so that the smart controller 27 and energy storage unit 11 can be referenced to different grounds for safety concerns.

The output control signal interface 26 passes signals back and forth between the low voltage output side of the power system 20 and the smart controller 27. Examples of these signals may include an output voltage measurement signal, an output current measurement signal, and power module current share control signals. The output interface 26 may use the same ground reference as the low voltage bus 29, which is often the chassis of the vehicle 15.

The smart controller 27 provides the intelligence for the system 20. The smart controller 27 processes signals and messages from the input control signal interface 23, the output control signal interface 26, and the vehicle controller 28. Based upon the status of these signals, the smart controller 27 turns on or off selected power modules 24-1, 24-2, . . . 24-N such that the system 20 operates at its optimum efficiency point.

The vehicle controller 28 is responsible for vehicle level issues such as source and load management. The vehicle controller 28 will typically tell the power system 20 when to turn on and off, as well as exchange fault status information.

Figure 4:
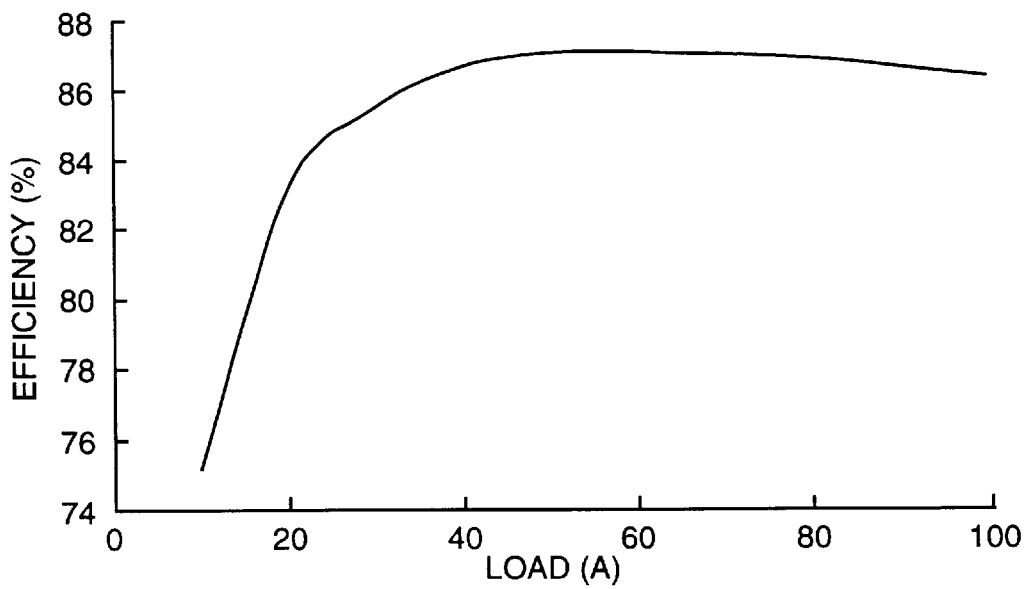
FIG. 4 is a graph that illustrates the efficiency of a conventional DC-to-DC converter.

To explain the principle of operation of the present system 20, the typical efficiency map of conventional DC-to-DC converters must be understood. FIG. 4 shows a typical curve that is representative of the efficiency versus load for a single conventional DC-to-DC supply 10a, such as is shown in FIG. 1. At high loads, the efficiency is very high. However, as the load drops, the efficiency also drops, approaching 0% at no load. The same curve applies to multiple modules 13-1, 13-2, . . . 13-N operating in parallel (the system 10b of FIG. 2), if the modules 13-1, 13-2, . . . 13-N are simply set to share load current.

In an electric or hybrid electric vehicle 15, the accessory load demand varies greatly over time. Many loads 31 are only used under certain circumstances, such as at night (lighting) or during bad weather (windshield wipers). Hence, the accessory load 15 may go from a low value to an extreme value depending on external factors. Examining FIG. 4, it can be seen that if the accessory power is supplied by a single DC-to-DC supply, system efficiency drops while the load is low. In fact, it is common that the average load is significantly lower than the peak load, indicating that a single DC-to-DC power supply 10a would not achieve its optimal efficiency.

The high efficiency distributed staged power system 20 uses multiple parallel power modules 24-1, 24-2, . . . 24-N, governed by the smart controller 27, to achieve optimal efficiency over a wide load range. At peak load 31, all power modules 24-1, 24-2, . . . 24-N are enabled. As the load 31 is reduced, some modules 24-1, 24-2, . . . 24-N may be turned off, such that the remaining modules 24-1, 24-2, . . . 24-N operate in their optimal efficiency range. The modules 24-1, 24-2, . . . 24-N are "staged" on or off appropriately depending on the load requirements. For a given configuration of N power modules 24-1, 24-2, . . . 24-N, there is an optimal operational configuration at each load operating point. This involve disabling some power modules 24-1, 24-2, . . . 24-N to increase the overall efficiency of the system 20 at lighter loads.

Figure 5:
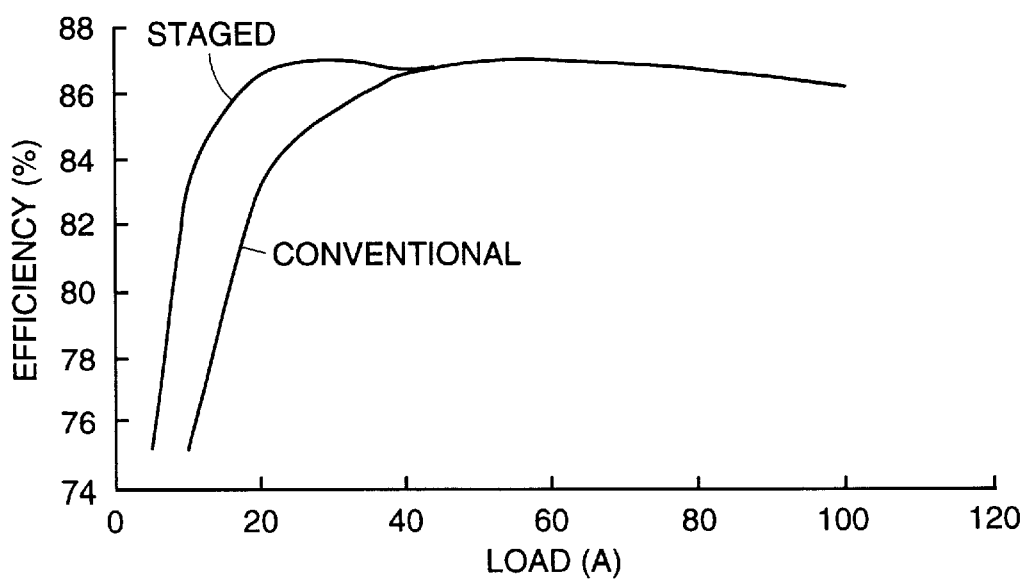
FIG. 5 is a graph that compares the efficiency of the present staged power system with a conventional power system.

As an example, FIG. 5 compares the efficiency of a system 10b operated in a conventional low efficiency current share mode, to the efficiency of the high efficiency distributed staged power system 20. In both cases, each system 10b, 20 has two power modules 13-1, 13-2, 24-1, 24-2, each capable of providing 50 amps DC. In the current share mode, both modules 13-1, 13-2 share current equally over the entire load range. Using the high efficiency distributed staged approach employed in the present system 20, one module 24-1 is disabled when the load 31 is less than 40 amps DC. Above 40 amps DC, both modules 24-1, 24-2 are enabled and share the load 31. As can be seen from the FIG. 5, the high efficiency distributed staged power system 20 efficiency is significantly improved at light loads 31.

The high efficiency distributed staged power system 20 offers other advantages such as N+1 redundancy for high reliability applications, and easy reconfiguration for different system load requirements.

Thus, an improved high efficiency distributed staged power system that may be used in electric and hybrid electric vehicles has been disclosed. It is to be understood that the above-described embodiment is merely illustrative of one of the many specific embodiments that represent applications of the principles of the present invention. Clearly, numerous and other arrangements can be readily devised by those skilled in the art without departing from the scope of the invention.

What is claimed is:

1. A high efficiency distributed staged power system comprising:

an energy storage unit;

a high voltage bus coupled to the energy storage unit;

an input filter coupled to the high voltage bus;

a parallel voltage converter comprising a plurality of parallel coupled power modules that is coupled to the input filter;

an output filter coupled to the parallel voltage converter;

a low voltage bus coupled between the output filter and one or more loads;

an input control signal interface coupled to the parallel voltage converter;

an output control signal interface coupled to the parallel voltage converter; and a smart controller coupled to the input and output control signal interfaces.

2. The system recited in claim 1 further comprising a vehicle controller coupled to the smart controller.

3. The system recited in claim 2 wherein the energy storage unit comprises a battery pack.

4. The system recited in claim 2 wherein the smart controller processes signals and messages received from the input control signal interface, the output control signal interface, and the vehicle controller, and the modules are staged on or off as a function of load requirements.

5. The system recited in claim 2 wherein the smart controller processes signals and messages received from the input control signal interface, the output control signal interface, and the vehicle controller, and based upon the status of these signals, turns on or off selected power module so that the system operates at its optimum efficiency point.

6. The system recited in claim 1 wherein the energy storage unit comprises a motor and generator.

7. The system recited in claim 1 wherein the power modules comprise high-efficiency switching power supplies.

8. The system recited in claim 1 wherein the power modules comprise high efficiency switchmode DC-to-DC converters.

9. The system recited in claim 1 wherein each module provides the same DC voltage gain.

10. The system recited in claim 1 wherein the input signal interface provides electrical isolation so that the smart controller and energy storage unit can be referenced to different grounds.

11. The system recited in claim 1 wherein the smart controller processes signals and messages received from the input control signal interface and the output control signal interface, and based upon the status of these signals, turns on or off selected power module so that the system operates at its optimum efficiency point.

12. The system recited in claim 1 wherein the energy storage unit comprises a super capacitor.

13. The system recited in claim 1 wherein the smart controller processes signals and messages received from the input control signal interface and the output control signal interface, and the modules are staged on or off as a function of load requirements.

14. The system recited in claim 1 wherein the energy storage unit comprises a fuel cell.

\* \* \* \* \*